A. C. LEGERE.
NUT LOCKING WASHER.
APPLICATION FILED JULY 8, 1908.

917,776.

Patented Apr. 13, 1909.

WITNESSES

INVENTOR
A. C. LEGERE.

BY

ATT'Y.

UNITED STATES PATENT OFFICE.

ALFRED CHARLES LEGERE, OF HALIFAX, NOVA SCOTIA, CANADA.

NUT-LOCKING WASHER.

No. 917,776.  Specification of Letters Patent.  Patented April 13, 1909.

Application filed July 8, 1908. Serial No. 442,613.

*To all whom it may concern:*

Be it known that I, ALFRED CHARLES LEGERE, of the city of Halifax, in the Province of Nova Scotia, Canada, have invented certain new and useful Improvements in Nut-Locking Washers, of which the following is a specification.

My invention relates to improvements in nut locking washers; and the objects of my invention are to provide improved means for holding the washer to the base, as hereinafter described in detail in the accompanying specifications and drawings.

Figures 2, 3:
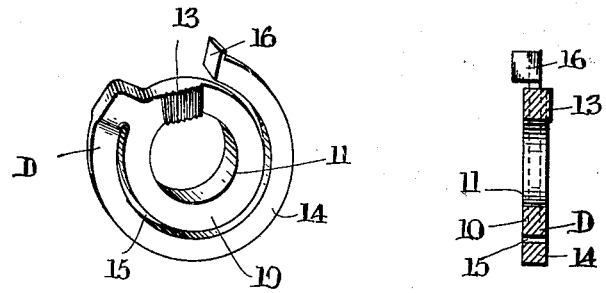
Figure 1:
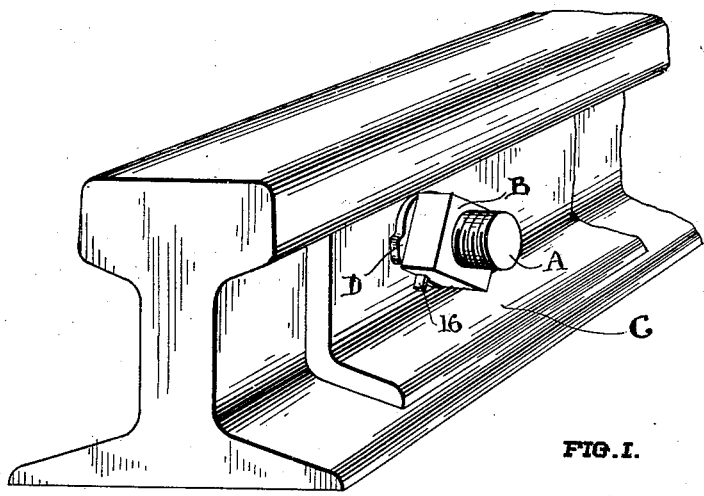

In the drawings, Figure 1 is a perspective view of the nut lock in position on the angle bar on railroad track construction. Fig. 2 is a perspective view of the washer. Fig. 3 is a transverse section through the same.

In the drawings like characters of reference indicate corresponding parts in each figure.

Referring to the drawings, A represents the bolt with a nut B thereon, C an ordinary angle bar.

D represents my improved nut locking washer, which comprises a plate 10 having a central aperture 11 through which the shank of the bolt passes, and being provided with means for preventing rotation. The means which I have invented to accomplish this comprises a plurality of teeth 13 formed on a convex projection on the underside of the washer 10. It is particularly important that this projection should be convex, as when it is so formed, any rocking movement of the washer only causes the teeth to grip more firmly, and therefore when it is attempted to unlock the bolt the plate will be tilted to cause the teeth to grip more firmly.

The locking of the nut is accomplished by a semi-annular spring finger 14 formed integrally with plate 10 and of less thickness than the same, whereby when the nut is tightened against the washer it will not bind the spring finger. The finger extends close to the semi-annular periphery of the plate, leaving a small annular space 15 between, and the end 16 on the finger is enlarged and bent upwardly at substantially right-angle to itself, thereby forming a ratchet tooth for the locking of the nut. The enlargement of the end enables the tooth to be more readily engaged to release the nut.

In using the washer, it is inserted in position between the angle-bar or base plate, through which the bolt extends and the nut. The nut is then screwed home and in doing so it will engage the end 16, springing the finger 14 outwardly. As soon as one face of the nut has passed the end 16, the rear side of the end will engage against the opposite face and thus bind and lock the same.

What I claim as my invention is:—

A nut locking washer comprising a plate adapted to fit around the bolt between the nut and base plate and having a convex projection on the underside formed with a plurality of gripping teeth adapted to grip the base and prevent rotation of the washer, a semi-annular spring finger integral with the plate and of less thickness than the same and having an enlarged projection on the end bent backwardly at an angle not less than a right angle to the plate to form a ratchet tooth for preventing the rotation of the nut, said projection being considerably greater in width than the finger, whereby it may be readily grasped to release the nut.

In witness whereof I have hereunto set my hand in the presence of two witnesses.

ALFRED CHARLES LEGERE.

Witnesses:
 JOSEPH A. JARRETT,
 GEO. B. STEPHENSON.